No. 786,291. PATENTED APR. 4, 1905.
H. G. HUBBELL.
BEAN PICKER.
APPLICATION FILED JUNE 2, 1904.

3 SHEETS—SHEET 1.

Witnesses
F. C. Barry.
G. Gould.

Inventor
H. G. Hubbell
By W. T. FitzGerald
Attorneys

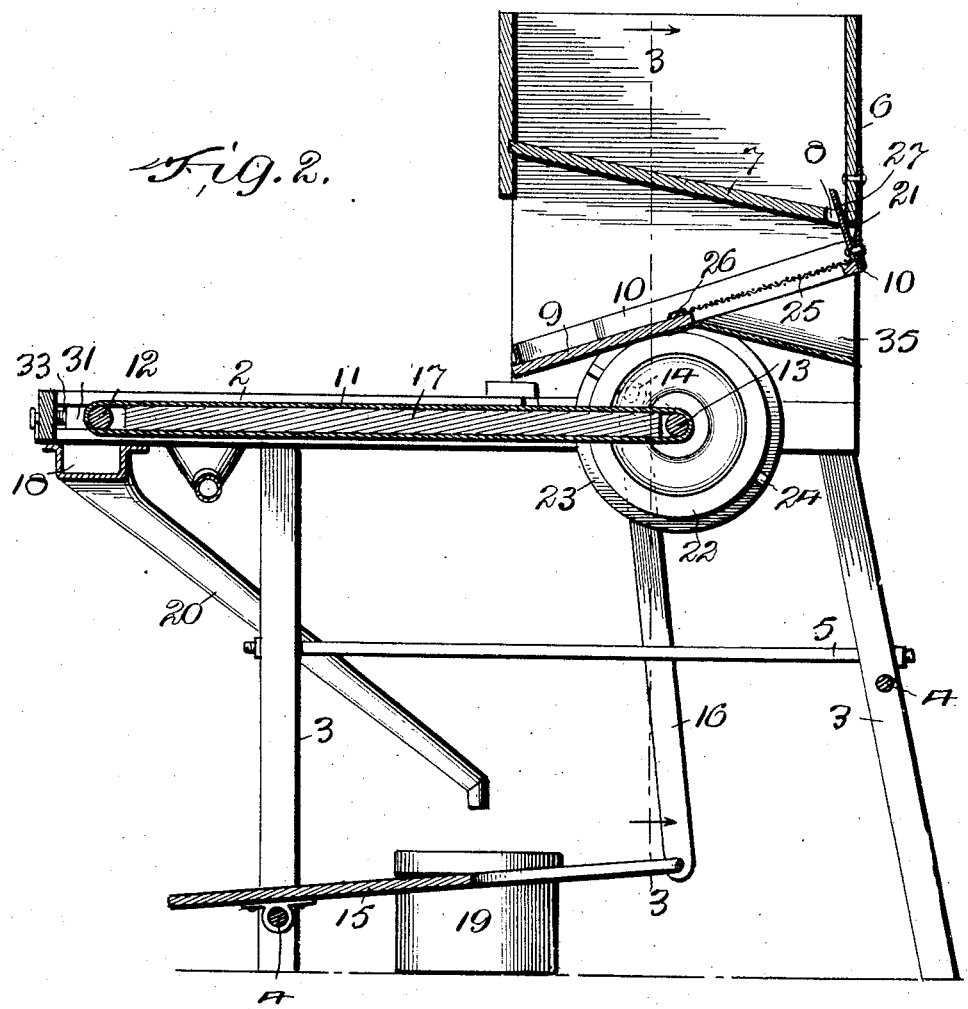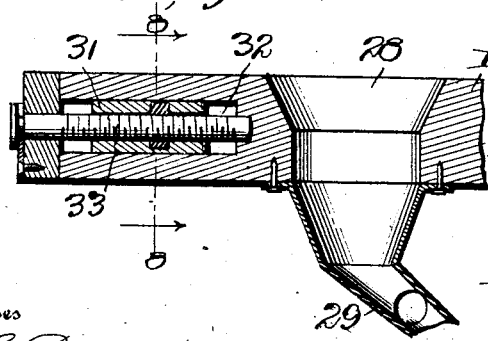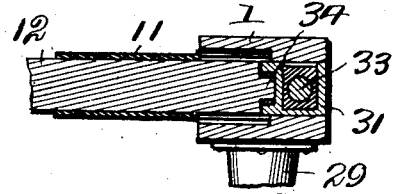

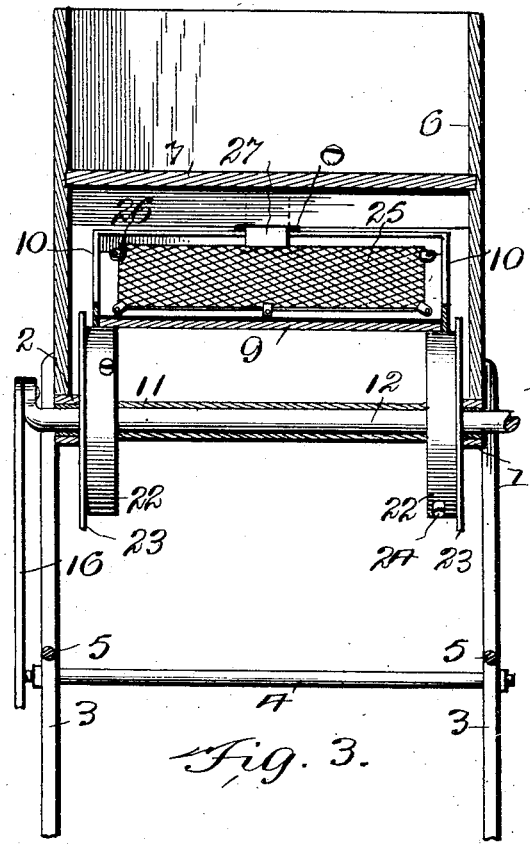
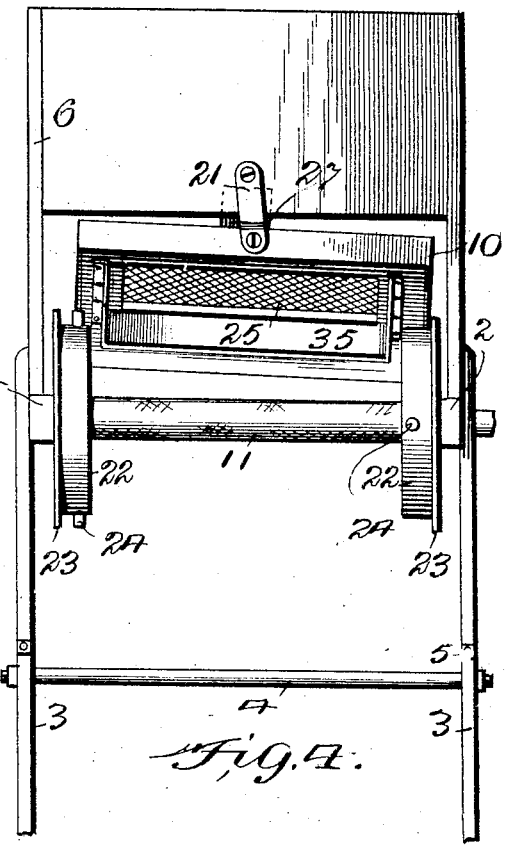
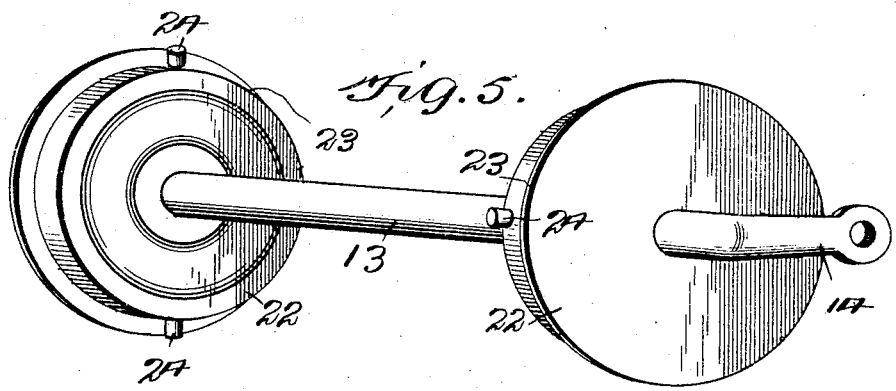

No. 786,291.

Patented April 4, 1905.

UNITED STATES PATENT OFFICE.

HERBERT G. HUBBELL, OF HECTOR, NEW YORK.

BEAN-PICKER.

SPECIFICATION forming part of Letters Patent No. 786,291, dated April 4, 1905.

Application filed June 2, 1904. Serial No. 210,883.

*To all whom it may concern:*

Be it known that I, HERBERT G. HUBBELL, a citizen of the United States, residing at Hector, in the county of Schuyler and State of New York, have invented certain new and useful Improvements in Bean-Pickers; and I do hereby declare the following to be a full, clear, and exact description of the invention, such as will enable others skilled in the art to which it appertains to make and use the same.

My invention relates to certain novel features of combination and construction of parts involved in the production of a bean cleaning and grading machine, as will be hereinafter clearly described, and pointed out in the claims.

The prime object of my invention, among others, is to provide a machine which will be of simple though reliably efficient construction and which will perfectly cleanse and grade the beans, separating the poor and defective beans from the good ones and also removing the trash or cleanings therefrom, the different parts thus separated from each other being separately delivered or conveyed to a suitable receptacle provided therefor.

A further object of my invention is to provide means for agitating the screen, whereby the broken beans, grit, &c., will be forced through the screen at the first operation, permitting the more perfect beans to pass down to another part of the machine.

Other objects and advantages will be hereinafter made clearly apparent, reference being had to the accompanying drawings, which are made a part of this application, and in which—

Figure 1:
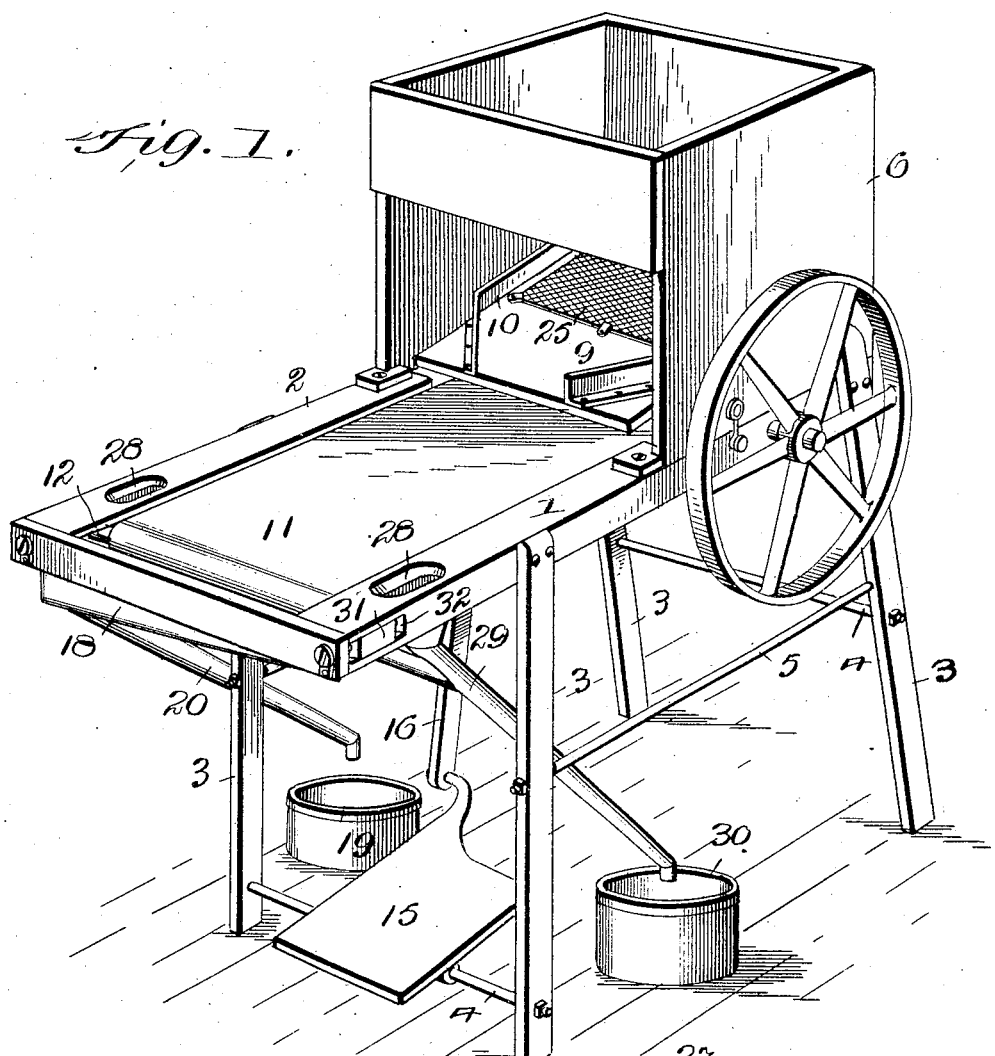
Figure 6:
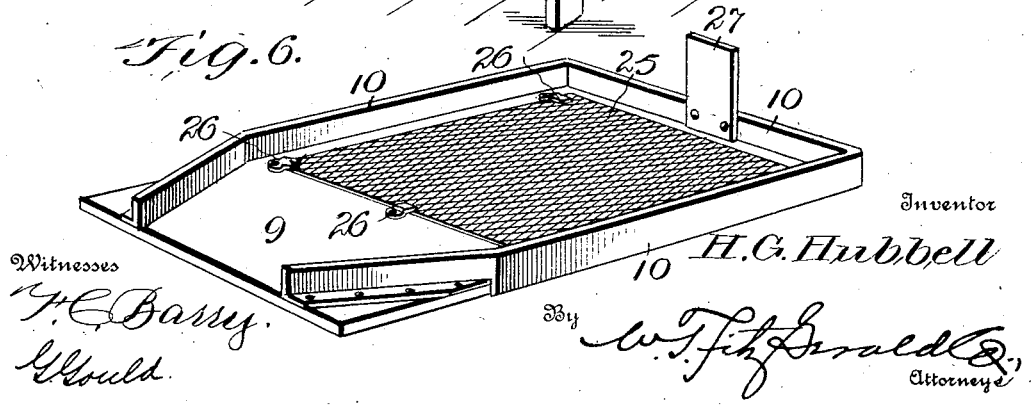

Figure 1 shows a perspective view of my invention complete ready for use. Fig. 2 is a central sectional view of my machine. Fig. 3 is a sectional view of my machine as taken on line 3 3 of Fig. 2. Fig. 4 is a front elevation of my machine. Fig. 5 is a detail view in perspective, showing the driving-shaft carrying the agitating disks or wheels. Fig. 6 is a perspective detail view of the cleansing-screen and framework carrying the same. Fig. 7 is a detail view showing means for tightening the conveyer-belt. Fig. 8 is a sectional view of Fig. 7 as taken on line 8 8.

For convenience of reference to the various elements of my invention and coöperating accessories numerals will be employed, the same numeral applying to a similar part throughout the several views.

Referring to the numerals on the drawings, 1 and 2 designate the side bars supported by the standards or legs 3, said parts constituting the main framework of my machine, it being understood that the said legs are to be braced or reinforced in any preferred way, as by the cross-rods 4 and the longitudinally-disposed rods 5 or the equivalent thereof. Upon one end of the framework thus or otherwise provided I erect the casing 6, which constitutes the hopper-section of my machine, said hopper having an inclined floor or bottom 7 leading toward the end of the machine, said floor having at its lower edge and central portion a recess or slot 8, and immediately beneath the bottom 7 I erect the screen-carrying frame 9, which is inclined inwardly, as clearly shown in Fig. 2, the sides of the screen-carrying member 9 being provided with the inwardly-converging flanges 10, whereby the contents of the screen-frame will be directed downward upon the endless carrier 11, which is mounted upon the end roller 12 and upon the driving-shaft 13. The driving-shaft 13 is mounted in suitable bearings in the framework and is provided at one end with the crank-arm 14, said crank-arm being operatively connected to the actuating-pedal 15, as by the link 16. It therefore follows that said shaft may be readily rotated by the foot of the operator. It will be observed that the pedal is operatively mounted upon one of the cross-bars 4, and thus placed in proper position. A suitable supporting-bed 17 is also carried by the framework or side bars 1 and 2, whereby the carrier will be reliably supported.

By reference to Fig. 2 it will be observed that the carrier extends under the inner end of the screen-carrying member 9 and travels outward away from said screen, and it therefore follows that the beans deposited thereon by the screen-carrying member will be conveyed to the outer end of the machine and there deposited in a receiving-hopper 18 and thence conveyed into a suitable receptacle 19, as by the conveyor tube or pipe 20.

The screen-carrying member or framework 9 is pivotally connected at its outer end to the outer side of the hopper or casing 6, as by the link member 21, and in order to cause a thorough agitation of the screen I mount upon the shaft 13 a pair of agitating disks or wheels 22, each preferably having upon its outer edge a flange 23 and each being provided at diametrically opposite points of their periphery with the lugs or agitating-points 24, and it therefore follows that the rotation of the wheels 22 will cause a thorough agitation of the screen 25, the latter being removably secured upon the screen-carrying frame 9, whereby any desired size of mesh for the screen may be chosen. The screen 25 may be very quickly removed and replaced by any suitable securing device, as the pivotally-mounted overhanging fingers 26 or the equivalent thereof.

To the outer end of the screen-carrying frame 9 I rigidly secure the hopper-agitator 27, which extends up loosely through the recess or opening 8 in the bottom of the hopper, thereby insuring that the contents of the hopper at this point will be kept under thorough agitation, and thereby prevent clogging of the recess, the result being that a perfect and uniform feed will be attained.

By the construction herein described it will be obvious that an intermittent movement or rocking motion of the screen-carrying frame will result from the rotation of the agitating wheels or disks 22, said movement or rocking motion being produced by the pins or lugs 24 being successively brought into contact with the lower side of the screen-carrying frame. When, therefore, one of the pins or lugs strikes the screen-carrying frame or shoe member 9, a sudden jarring motion is the result, causing the split or shrunken beans and small stones and grit to pass through the meshes of the screen, which would otherwise pass down the screen upon the canvas if the sudden jarring motion were not thus applied—that is to say, a piece, as a half of a bean or a small piece of gravel, would be found to almost invariably travel down an inclined screen entirely to the bottom thereof and off upon the canvas in the absence of a sudden jar to the screen—and I therefore regard it as absolutely essential to a proper cleansing and separation of broken beans, gritty substance, &c., from the good beans that some such means as I have illustrated shall be provided for imparting a sudden and more or less violent jar or upward movement to the screen, and while I have described in this application the preferred means of accomplishing this most desirable and important result I desire to comprehend such equivalents and substitutes as may be regarded as falling fairly within the scope of my invention. When the agitating-disks are rotated, the first pin coming into engagement with the shoe or screen-carrying member 9 causes that side of said member and the screen carried thereby to be suddenly elevated, while the opposite edge of the screen-carrying member is caused to strike the periphery of the opposite wheel, the result being that the contact with one pin thus causes two distinct blows or jars to be imparted to the screen, the result being that one edge of the screen will be thus left down in the path of the lug or pin carried by the wheel immediately under the same, when the operation will be repeated of violently raising the depressed side of the screen and causing the opposite edge of the screen-carrying member to be brought into sharp contact with the opposite wheel, the operation or rocking motion thus being continued as long as the driving-shaft is actuated. The good beans, together with the half-poor beans of full size, will thus be delivered by the screen-carrying member 9 upon the endless carrier, made of canvas or other preferred material, and as said carrier travels outward the beans thereon will be conveyed into the receiving hopper or box 18, and as the beans will thus be spread out evenly over the carrier opportunity is given to the watchful operator to remove any spoiled beans or larger pieces of stone which have not passed through the screen, which removed particles may be dropped by the attendant or attendants in one or the other of the receivers 28, each of said receivers being properly connected with a conveyer-chute 29, leading to a suitable receptacle 30, placed at a convenient point.

It is obvious that the different varieties of beans, peas, and the like may be successfully treated, cleansed, and graded by a proper choice of screens, and I have therefore made it possible to quickly renew and replace the screens, as above set forth. The feeding-agitator 27 being rigidly secured to the shoe or screen-carrying member 9 is actuated by the same means employed for the actuation of the screen itself, thereby simplifying the construction and eliminating unnecessary parts at the same time insuring perfect, uniform, and steady feed. The agitator is also of such character that when the machine is stopped the feeding process is also immediately discontinued. Inasmuch as it becomes desirable to properly adjust the tension of the endless carrier, I provide that the roller 12 shall be mounted at each end in the bearing-blocks 31, located in the slotted opening or recess 32 in the outer ends of the frame members 1 and 2, said bearing-block being placed in coöperation with the threaded tension-bolt 33, extending to a convenient point at the end of the machine, and it is obvious that by a proper rotation of said tension-bolt the bearing-blocks may be moved inward or outward, as desired. The bearing-blocks 31 are provided on their inner sides with a bearing-seat adapted to receive the trunnion 34 upon the end of the carrying-roller 12, as more clearly shown in Fig. 8.

By reference to Fig. 2 and other views it will also be observed that the small stones, pieces of beans, &c., passing through the screen 25 will fall upon the outwardly-inclined apron or conveyer 35 and drop upon the ground or into any suitable receptacle.

The various parts of my invention may be cheaply and expeditiously manufactured and readily assembled each in its respective operative position, and believing that the construction and manner of using my invention have thus been made clearly apparent further description is deemed unnecessary.

What I claim as new, and desire to secure by Letters Patent, is—

1. In a machine of the character specified, a suitable frame; a hopper-section mounted on said frame; a screen-carrying member or shoe 9 pivoted at its outer end and having its inner end resting upon suitable supports; an extension or agitator carried by said shoe and extending upward through a recess in the bottom of the hopper; an endless carrier reaching under and coöperating with the screen-carrying frame; a driving-shaft and means carried by said shaft comprising a pair of disks having lugs thereon, the lugs on one disk being at a phase difference of one-half the angular distance between the lugs on the disks, from the lugs of the other disk to impart a more or less violent blow to each side of the screen-carrying frame whereby one edge thereof will be suddenly elevated while the lower edge will be depressed in sudden contact with an agitator upon the other side of the machine adjacent to said edge and cause the beans or the like to travel over the screen in a zigzag path and additional means to receive and convey the cleansed beans and the like and the particles removed therefrom into separate receptacles, all combined substantially as specified and for the purpose set forth.

2. The herein-described bean-picker, comprising a suitable frame, a hopper-section mounted upon said frame, a screen-carrying member or shoe 9 pivoted at its outer end to said hopper and having its inner end restricted, an agitator carried by said shoe and extending upward through a recess in the bottom of the hopper, a driving-shaft mounted in said frame, a pair of disks secured to said shaft, said disks having agitating-points 24, and also having flanges upon one of their edges whereby said screen-carrying member 9 will be properly guided, all combined substantially as set forth.

In testimony whereof I have signed my name to this specification in the presence of two subscribing witnesses.

HERBERT G. HUBBELL.

Witnesses:
 JOSEPH STILWELL,
 G. M. STILWELL.